(12) United States Patent
Nishihata et al.

(10) Patent No.: US 6,195,189 B1
(45) Date of Patent: Feb. 27, 2001

(54) LIGHT BEAM SCANNING SYSTEM

(75) Inventors: Sumihiro Nishihata; Hiromi Ishikawa, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/178,641

(22) Filed: Oct. 26, 1998

(30) Foreign Application Priority Data

Oct. 24, 1997 (JP) ..................................................... 9-292687

(51) Int. Cl.$^7$ ..................................................... G02B 26/08
(52) U.S. Cl. ........................... 359/205; 359/206; 359/216
(58) Field of Search ..................... 359/196, 197, 359/198, 199, 200, 201, 202, 203, 204, 205–208, 209, 210, 211, 212, 213, 214, 215, 216–219, 220, 221, 222, 223, 224, 225, 226, 662

(56) References Cited

U.S. PATENT DOCUMENTS

| | | | |
|---|---|---|---|
| 3,995,110 | * 11/1976 | Starkweather | 359/217 |
| 5,005,928 | * 4/1991 | Suzuki et al. | 359/206 |
| 5,276,544 | * 1/1994 | Maeda | 359/196 |
| 5,408,095 | * 4/1995 | Atsuumi et al. | 359/208 |

FOREIGN PATENT DOCUMENTS

| | | | |
|---|---|---|---|
| 2-115814 | 4/1990 | (JP) | G02B/26/10 |
| 4-361218 | 12/1992 | (JP) | G02B/26/10 |

* cited by examiner

*Primary Examiner*—James Phan
(74) *Attorney, Agent, or Firm*—Sughrue, Mion, Zinn, Macpeak & Seas, PLLC

(57) ABSTRACT

In a light beam scanning system, a beam shaper shapes light beam emitted from a light source. The shaped light beam is deflected by a deflector to scan a surface in a main scanning direction. A scanning/imaging optical system causes the light beam deflected by the deflector to form an image on the surface and scan the same. The beam shaper includes a diverging optical system which converts the light beam into divergent light. The scanning/imaging optical system consists of first and second lens elements arranged in this order from the light source side and having first to fourth surfaces as numbered from the light source side and satisfies formulae, $$-1.42 < f_{all}/f_{GF} < 0 \qquad (1)$$

$$r_{1GR} < 0, \; r_{2GR} < 0, \; r_{4GR} < 0 \qquad (2)$$

$$f_{GR1} > 0, \; f_{GR2} > 0 \qquad (3)$$

wherein $f_{all}$, $f_{GF}$, $r_{1GR}$, $r_{2GR}$, $r_{4GR}$, $f_{GR1}$ and $f_{GR2}$ respectively represent the composite focal length of the beam shaper and the scanning/imaging optical system, the focal length of the beam shaper, the radius of curvature of the first surface of the scanning/imaging optical system, the radius of curvature of the second surface of the scanning/imaging optical system, the radius of curvature of the fourth surface of the scanning/imaging optical system, the focal length of the first lens element and the focal length of the second lens element.

7 Claims, 14 Drawing Sheets fθ PROPERTY

CURVATURE OF FIELD

LIGHT BEAM SCANNING SYSTEM

BACKGROUND OF THE INVENTION

1. Field of the Invention

This invention relates a light beam scanning system which causes a light beam emitted from a light source and deflected by a deflector to scan a surface.

2. Description of the Related Art

A light beam scanning system is employed in an image read-out system and an image recording system in order to scan a recording medium by a light beam for reading out or recording an image on the recording medium. For example, in a radiation image read out system employing a stimulable phosphor sheet, the stimulable phosphor sheet is scanned by a stimulating light beam and light emitted from the stimulable phosphor sheet upon stimulation thereof is detected. As such a light beam scanning system, there has been known those comprising a light source, a deflector such as a rotary polygonal mirror for deflecting the light beam emitted from the light source, and a scanning/imaging optical system which causes the light beam deflected by the deflector to form an image on the surface of a recording medium and scan the same and is provided with an optical element such as an fθ lens for causing the light to scan the surface at a constant speed and correcting curvature of field. An image is recorded on the recording medium or an image is read out from the recording medium by two-dimensionally scanning the surface of the recording medium by the light beam by causing the light beam to scan the surface at a constant speed in one direction (main scanning) while the recording medium is moved in a sub-scanning direction perpendicular to the main scanning direction.

In one type of such a light beam scanning system, the light beam is collimated by a beam shaper and the collimated light beam is caused to scan the surface as disclosed, for instance, in Japanese Unexamined Patent Publication No. 2(1990)-115814, and in another type, the light beam is converged to form a beam spot on the surface and the beam spot is caused to scan the surface in order to suppress curvature of field as disclosed, for instance, in Japanese Unexamined Patent Publication No. 4(1992)-361218.

However in the light beam scanning systems disclosed in the above identified patent publications where a collimated light beam or a converged light beam is caused to scan the surface, there has been a problem that when the light beam is deflected by an angle larger than 90° to scan a larger area of the surface, fθ correction for ensuring that the light beam accurately scans the surface at a constant speed makes it impossible to accurately correct curvature of field. Though both the fθ properties and the curvature of field can be accurately corrected by increasing the number of the lens elements in the scanning/imaging optical system, increase in the number of the lens elements increases the size of the system and adds to the cost.

SUMMARY OF THE INVENTION

In view of the foregoing observations and description, the primary object of the present invention is to provide a light beam scanning system in which both the fθ properties and the curvature of field can be accurately corrected.

A light beam scanning system in accordance with the present invention comprises a beam shaper means which shapes a light beam emitted from a light source, a deflector means which deflects the light beam to scan a surface in a main scanning direction, and a scanning/imaging optical system which causes the light beam deflected by the deflector to form an image on the surface and scan the same, and characterized in that the beam shaper means comprises a diverging optical system which converts the light beam into divergent light.

In a preferred embodiment of the present invention, the scanning/imaging optical system consists of first and second lens elements arranged in this order from the side of the light source and having first to fourth surfaces as numbered from the side of the light source and satisfies the following formulae (1) to (3), $$-1.42 < f_{all}/f_{GF} < 0 \tag{1}$$

$$r_{1GR} < 0,\ r_{2GR} < 0,\ r_{4GR} < 0 \tag{2}$$

$$f_{GR1} > 0,\ f_{GR2} > 0 \tag{3}$$

wherein $f_{all}$ represents the composite focal length of the beam shaper means and the scanning/imaging optical system, $f_{GF}$ represents the focal length of the beam shaper means, $r_{1GR}$ represents the radius of curvature of the first surface of the scanning/imaging optical system, $r_{2GR}$ represents the radius of curvature of the second surface of the scanning/imaging optical system, $r_{4GR}$ represents the radius of curvature of the fourth surface of the scanning/imaging optical system, $f_{GR1}$ represents the focal length of the first lens element and $f_{GR2}$ represents the focal length of the second lens element.

Further it is preferred that the light beam scanning system of the present invention be provided with a surface tilt correction optical system for correcting fluctuation in pitches on the surface to be scanned due to tilt of the deflecting surface of the deflector means.

To correct distortion of an optical system is to cause the optical system to satisfy characteristics of f·tan θ from definition of distortion. The relation between a scanning angle θ and tan θ is θ<tan θ, which naturally gives a relation of f·θ<f·tan θ. Accordingly in order to effect fθ correction, it is necessary to intentionally undercorrect distortion by f·|θ−tan θ|.

When a lens system is used with an object point set nearer than a design criterion, there is generally a tendency for distortion to be undercorrected. Accordingly when divergent light is caused to enter the scanning/imaging optical system of the light beam scanning system, a state equivalent to setting nearer the object point, whereby distortion can be undercorrected. Thus by causing divergent light to enter the scanning/imaging optical system, fθ properties can be corrected more accurately without increasing the number of lens elements in the scanning/imaging optical system.

Further when the beam shaper means and the scanning/imaging optical system satisfy formulae (1) to (3), curvature of field can be minimized with fθ properties corrected accurately.

Further when the surface tilt correction optical system is provided, fluctuation in pitches on the surface to be scanned due to tilt of the deflecting surface of the deflector means can be corrected and the light beam can scan the surface at a high resolution.

DESCRIPTION OF THE PREFERRED EMBODIMENTS

Figure 1A:
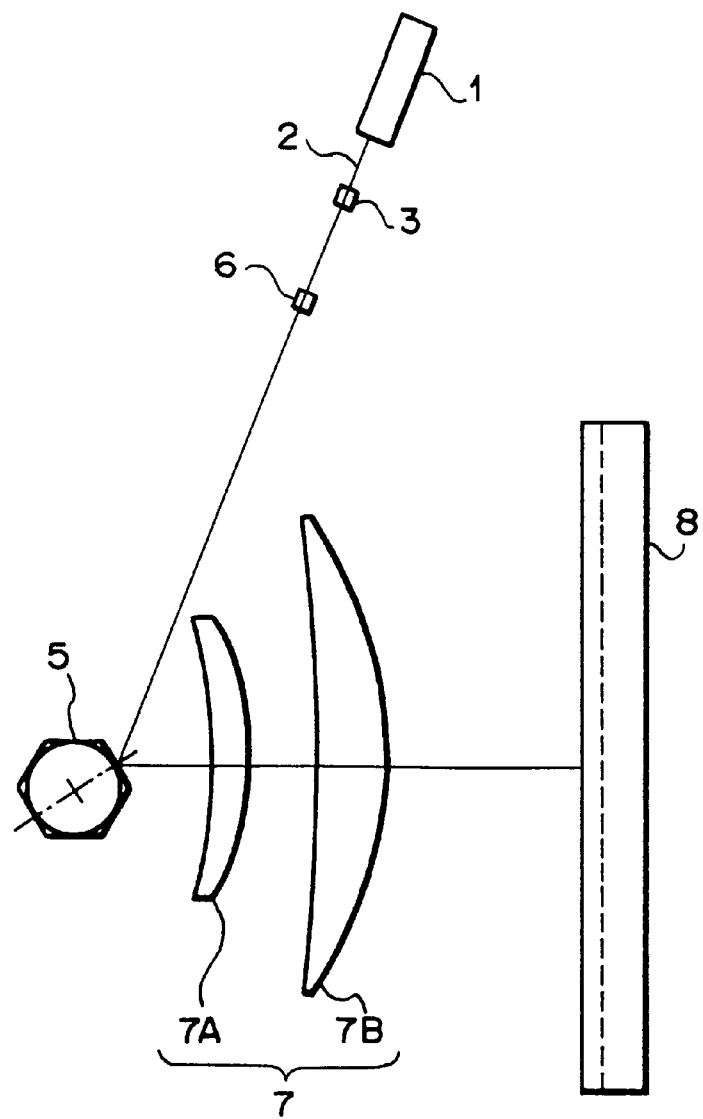
FIG. 1A is a plan view of a light beam scanning system in accordance with a first embodiment of the present invention.
Figure 1B:
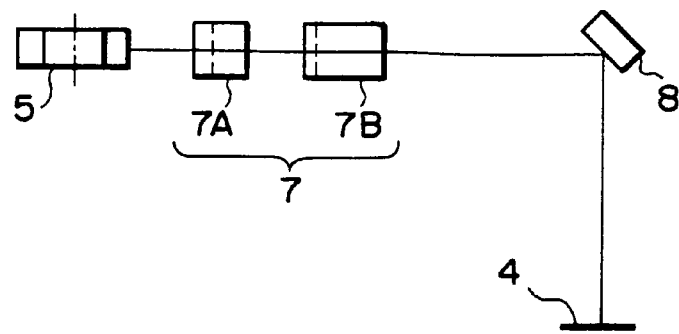
FIG. 1B is a side view of the light beam scanning system of the first embodiment.

In FIGS. 1A and 1B, a light beam scanning system in accordance with a first embodiment of the present invention comprises a light source 1, a diverging optical system 3 which diverges a light beam 2 emitted from the light source 1, a rotary polygonal mirror 5 which deflects the diverged light beam 2 toward a surface 4 to be scanned, a cylindrical lens 6 which is disposed upstream of the polygonal mirror 5 and forms an image of the light beam 2 on a deflecting surface of the polygonal mirror 5, a scanning/imaging optical system 7 which disposed downstream of the polygonal mirror 5 and forms an image of the light beam 2 on the surface 4 and a reflecting mirror 8 which reflects the light beam 2 toward the surface 4. The scanning/imaging optical system 7 consists of first and second fθ lenses 7A and 7B.

In the light beam scanning system of this embodiment, the light beam 2 emitted from the light source 1 is converted to a divergent light beam by the diverging optical system 3 and then is caused to form an image of a deflecting surface of the rotary polygonal mirror 5. The light beam 2 deflected by the polygonal mirror 5 travels through the scanning/imaging optical system 7 and is reflected by the reflecting mirror 8 to form an image on the surface 4. As the rotary polygonal mirror 5 rotates, the image of the light beam 3 scans the surface 4 in the main scanning direction while the surface 4 is conveyed by a conveyor means (not shown) in a sub-scanning direction substantially perpendicular to the main scanning direction, whereby the light beam 2 two-dimensionally scans the entire surface 4.

Figure 2A:
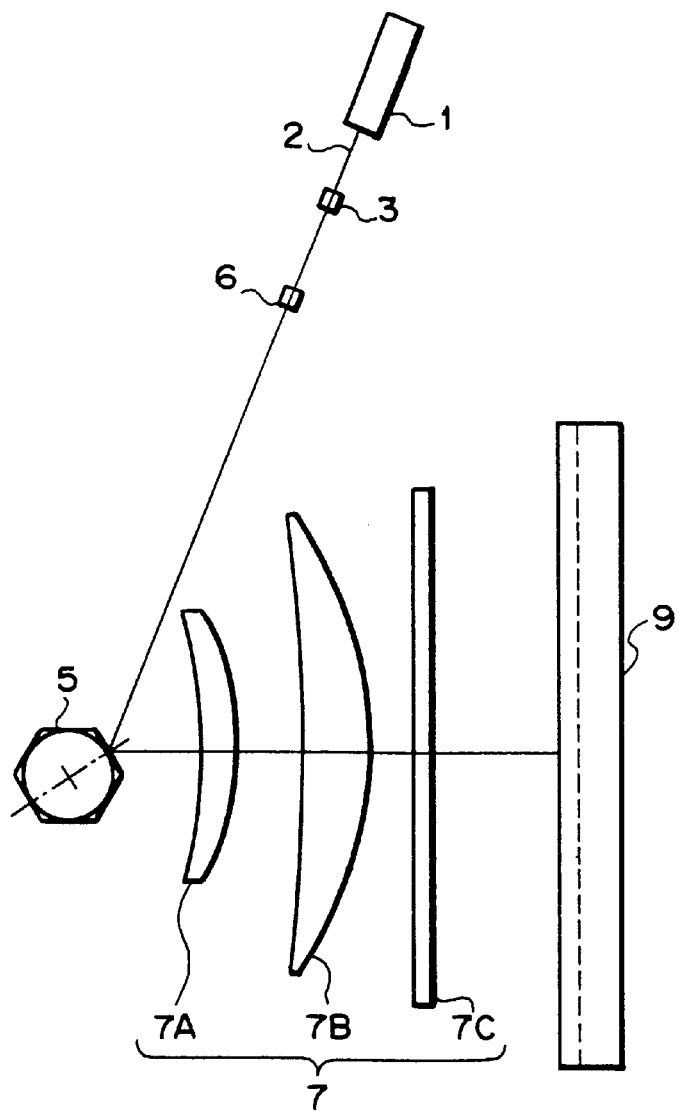
FIG. 2A is a plan view of a light beam scanning system in accordance with a second embodiment of the present invention.
Figure 2B:
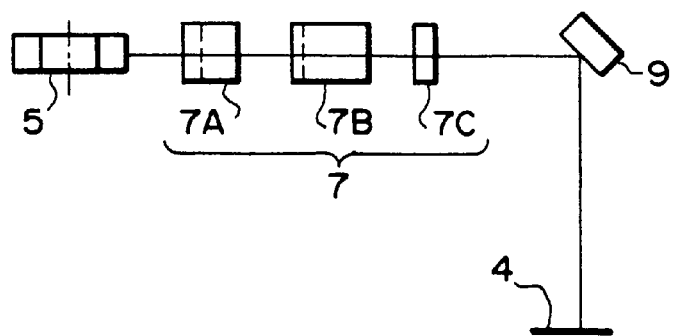
FIG. 2B is a side view of the light beam scanning system of the second embodiment.

A light beam scanning system in accordance with a second embodiment of the present invention will be described with reference to FIGS. 2A and 2B, hereinbelow. In FIGS. 2A and 2B, the elements analogous to those shown in FIGS. 1A and 1B are given the same reference numerals and will not be described here. The light beam scanning system of the second embodiment differs from that of the first embodiment in that a cylindrical lens 7C having power in a direction perpendicular to the main scanning direction on the surface 4 is added to the scanning/imaging optical system 7 and a cylindrical mirror 9 is employed in place of the reflecting mirror 8.

When the cylindrical lens 7C and the cylindrical mirror 9 are employed, fluctuation in pitches on the surface 4 due to tilt of deflecting surfaces of the rotary polygonal mirror 5 can be corrected and the light beam 2 can be converged to a beam spot of high density, whereby scanning at a high resolution can be realized.

Specified examples of scanning/imaging optical systems which can be employed in the present invention will be described in comparison with a scanning/imaging optical system for comparison (will be referred to as "the comparative scanning/imaging optical system", hereinbelow) employed in a conventional light beam scanning system, hereinbelow.

Comparative Scanning/imaging Optical System

Figure 3:
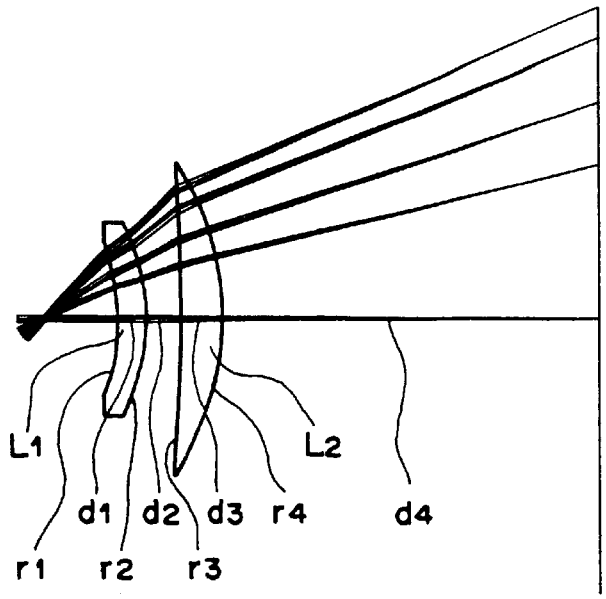
FIG. 3 is a view showing the arrangement of a scanning/imaging optical system for comparison.

As shown in FIG. 3, the comparative scanning/imaging optical system consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 1. In table 1 and the following tables 2 to 7, the subscripts attached to r and d represents the order of the faces of the lenses and the surface separations as numbered from the light source side.

In tables 1 to 7, $f_{all}$ represents the composite focal length of the diverging optical system and the scanning/imaging optical system, $f_{GF}$ represents the focal length of the diverging optical system, $r_{1GR}$ represents the radius of curvature of the first surface of the scanning/imaging optical system, $r_{2GR}$ represents the radius of curvature of the second surface of the scanning/imaging optical system, $r_{4GR}$ represents the radius of curvature of the fourth surface of the scanning/imaging optical system, $f_{GR1}$ represents the focal length of the first lens element L1 and $f_{GR2}$ represents the focal length of the second lens element L2. In the comparative scanning/imaging optical system, $f_{GF}=\infty$ and $f_{all}/f_{GF}=0$ since no diverging optical system is provided. Further in tables 1 to 7, "ratio" is a ratio of the scanning angle at the measuring point to the maximum scanning angle, "curvature of field" is astigmatism in the main scanning direction and "fθ properties" is a value obtained by dividing the difference between the position of an actual scanning spot on a scanning line and the position of a reference point by the position of the reference point. "p—p" is the difference between a maximum value and a minimum value of each of the curvature of field and the fθ properties.

TABLE 1 lens data

| | face No. | r | d | glass |
|---|---|---|---|---|
| deflector | | | 50.000000 | |
| scanning/imaging | 1 | −167.93968 | 20.000000 | F2HOYA |
| | 2 | −148.97870 | 23.171879 | |
| optical system | 3 | −1435.97524 | 30.000000 | FD10HOYA |
| | 4 | −194.92760 | 261.094685 | |

| entrance pupil diameter | 3.00 |
|---|---|
| wavelength | 657 nm |
| maximum scanning angle (half) | 48° | power distribution

| $f_{GF}$ | ∞ | $f_{GR1}$ | 1530.79 |
|---|---|---|---|
| $f_{GR}$ | 254.02 | $f_{GR2}$ | 309.79 |
| $f_{all}$ | 254.02 | $f_{all}/f_{GF}$ | 0.000 | performance

| ratio | scanning angle | curvature of field | fθ (%) |
|---|---|---|---|
| 1.0 | 48.0 | −0.500 | −0.014 |
| 0.9 | 43.2 | 0.500 | 0.094 |
| 0.8 | 38.4 | 0.404 | 0.102 |
| 0.7 | 33.6 | 0.003 | 0.044 |

TABLE 1-continued

| 0.6 | 28.8 | −0.339 | −0.054 |
|---|---|---|---|
| 0.5 | 24.0 | −0.500 | −0.172 |
| 0.4 | 19.2 | −0.483 | −0.291 |
| 0.3 | 14.4 | −0.351 | −0.399 |
| 0.2 | 9.6 | −0.183 | −0.484 |
| 0.1 | 4.8 | −0.050 | −0.538 |
| 0.0 | 0.0 | 0.000 | −0.556 |

| min | −0.500 | −0.556 |
|---|---|---|
| max | 0.500 | 0.102 |
| p-p | 1.000 | 0.658 |

Figure 4:
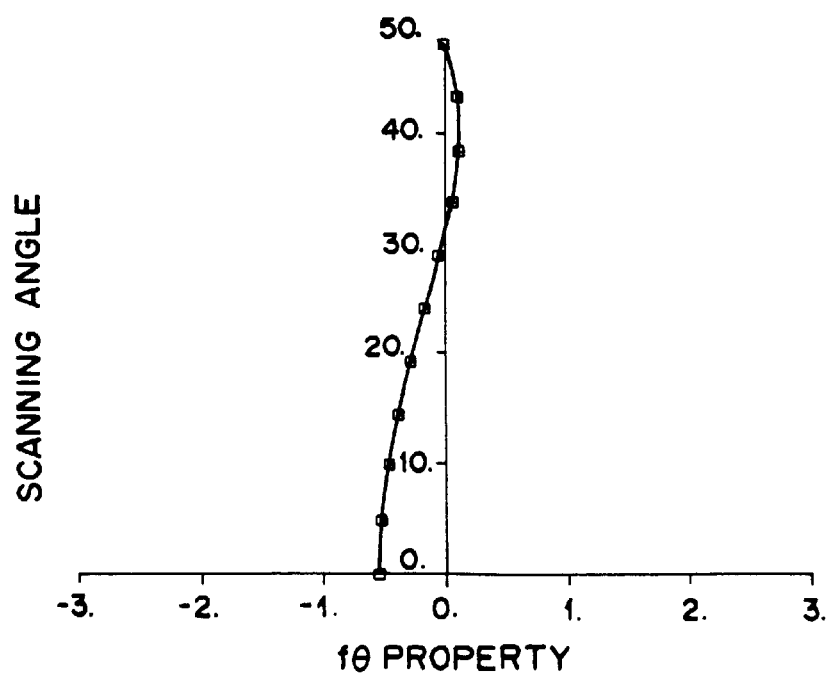
FIG. 4 is a view showing the relation between the fθ properties and the scanning angle in the scanning/imaging optical system for comparison.
Figure 5:
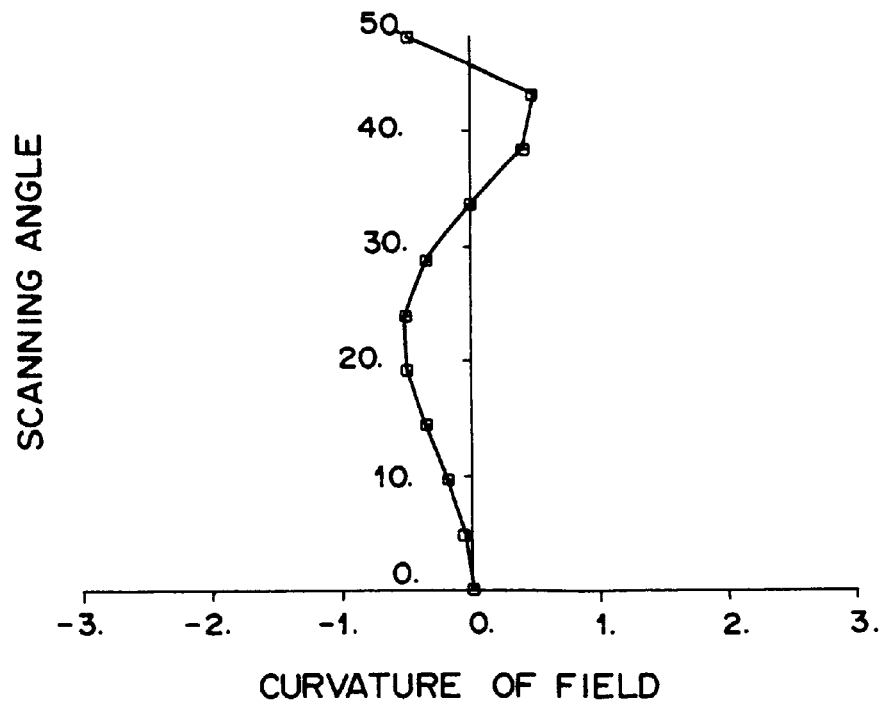
FIG. 5 is a view showing the relation between the curvature of field in the main scanning direction and the scanning angle in the scanning/imaging optical system for comparison.

The relation between the fθ properties and the scanning angle and the relation between the curvature of field in the main scanning direction and the scanning angle in the comparative scanning/imaging optical system are shown in FIGS. 4 and 5 respectively. As can be seen from FIGS. 4 and 5, the curvature of field in the main scanning direction and the fθ properties of the comparative scanning/imaging optical system are practically satisfactory.

EXAMPLE 1

Figure 6:
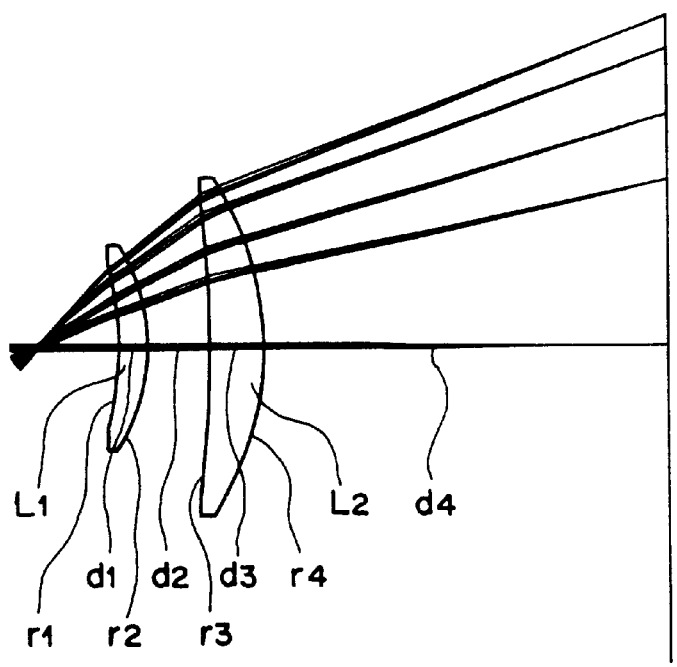
FIG. 6 is a view showing the arrangement of a first example of the scanning/imaging optical system which can be employed in the present invention.

A first specified example of the scanning/imaging optical system which can be employed in the light beam scanning system of the present invention where a divergent light beam is used is shown in FIG. 6. The scanning/imaging optical system of the first specified example consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 2. The scanning/imaging optical system of the first example satisfies the following formulae (1) to (3).

$$-1.42 < f_{all}/f_{GF} < 0 \quad (1)$$

$$r_{1GR} < 0, \; r_{2GR} < 0, \; r_{4GR} < 0 \quad (2)$$

$$f_{GR1} > 0, \; f_{GR2} > 0 \quad (3)$$

TABLE 2 lens data

| | face No. | r | d | glass |
|---|---|---|---|---|
| diverging | 1 | 233.37052 | 10.000000 | BSC7 HOYA |
| optical system | 2 | 152.89002 | 10.000000 | |
| deflector | | | 50.000000 | |
| scanning/ | 1 | −236.77409 | 20.000000 | BSC7 HOYA |
| imaging | 2 | −124.04771 | 39.979159 | |
| optical system | 3 | −846.65183 | 35.520000 | BAFD7 HOYA |
| | 4 | −200.75975 | 267.101832 | |

| entrance pupil diameter | 3.00 |
|---|---|
| wavelength | 657 nm |
| maximum scanning angle (half) | 48° | power distribution

| $f_{GF}$ | −900.01 | $f_{GR1}$ | 477.83 |
|---|---|---|---|
| $f_{GR}$ | 222.31 | $f_{GR2}$ | 369.51 |
| $f_{all}$ | 255.62 | $f_{all}/f_{GF}$ | −0.284 |

TABLE 2-continued

| | performance | | |
|---|---|---|---|
| ratio | scanning angle | curvature of field | fθ (%) |
| 1.0 | 48.0 | −0.184 | −0.027 |
| 0.9 | 43.2 | 0.500 | 0.038 |
| 0.8 | 38.4 | 0.333 | 0.051 |
| 0.7 | 33.6 | −0.053 | 0.028 |
| 0.6 | 28.8 | −0.363 | −0.017 |
| 0.5 | 24.0 | −0.500 | −0.075 |
| 0.4 | 19.2 | −0.472 | −0.136 |
| 0.3 | 14.4 | −0.340 | −0.192 |
| 0.2 | 9.6 | −0.176 | −0.237 |
| 0.1 | 4.8 | −0.048 | −0.266 |
| 0.0 | 0.0 | 0.000 | −0.276 |
| min | | −0.500 | −0.276 |
| max | | 0.500 | 0.051 |
| p-p | | 1.000 | 0.327 |

Figure 7:
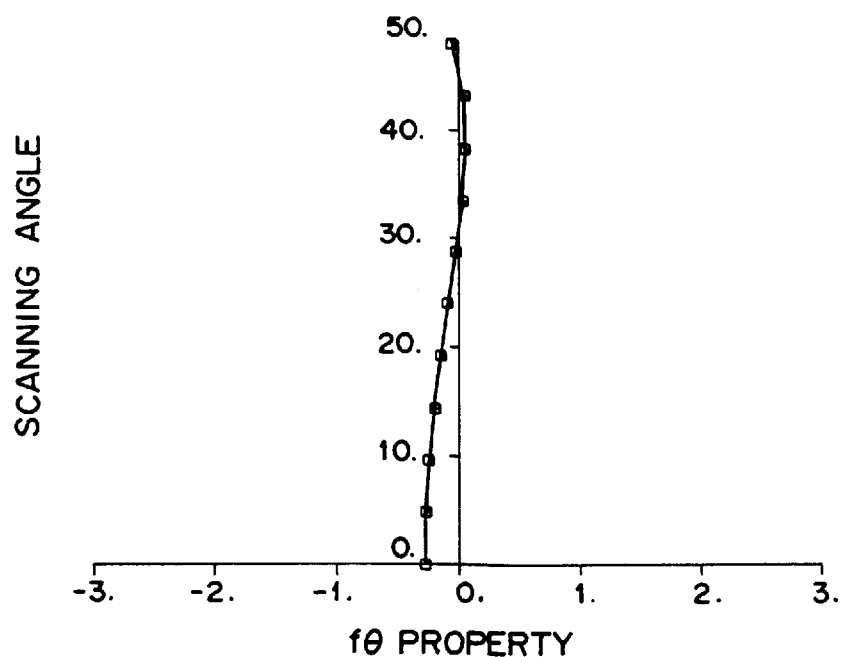
FIG. 7 is a view showing the relation between the fθ properties and the scanning angle in the scanning/imaging optical system of the first example.
Figure 8:
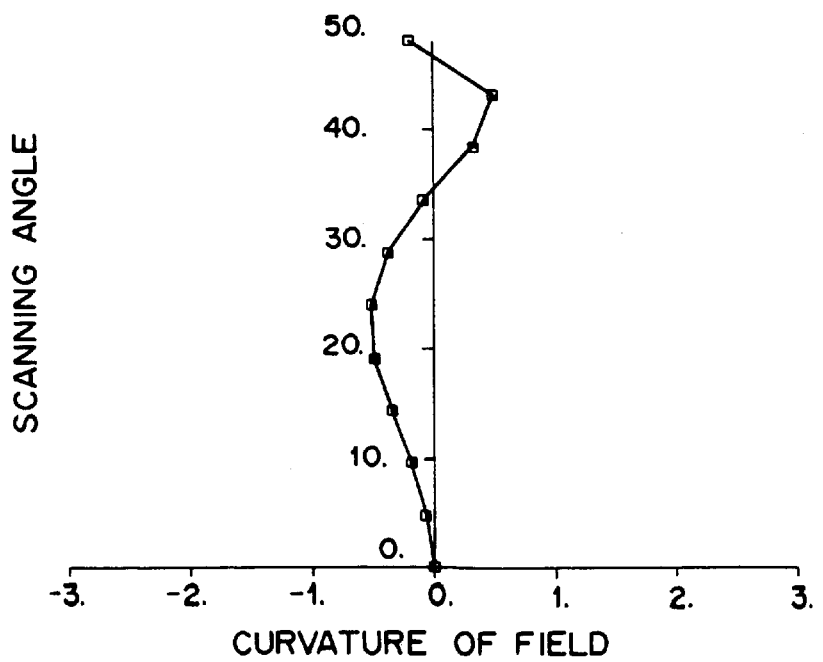
FIG. 8 is a view showing the relation between the curvature of field in the main scanning direction and the scanning angle in the scanning/imaging optical system of the first example.

The relation between the fθ properties and the scanning angle and the relation between the curvature of field in the main scanning direction and the scanning angle in this example are shown in FIGS. 7 and 8 respectively. As can be seen from table 2 and FIGS. 7 and 8, this example is equivalent to the comparative scanning/imaging optical system in the curvature of field in the main scanning direction and is greatly superior to the comparative scanning/imaging optical system in the fθ properties, that is, the former is substantially half of the latter in p—p.

EXAMPLE 2

Figure 9:
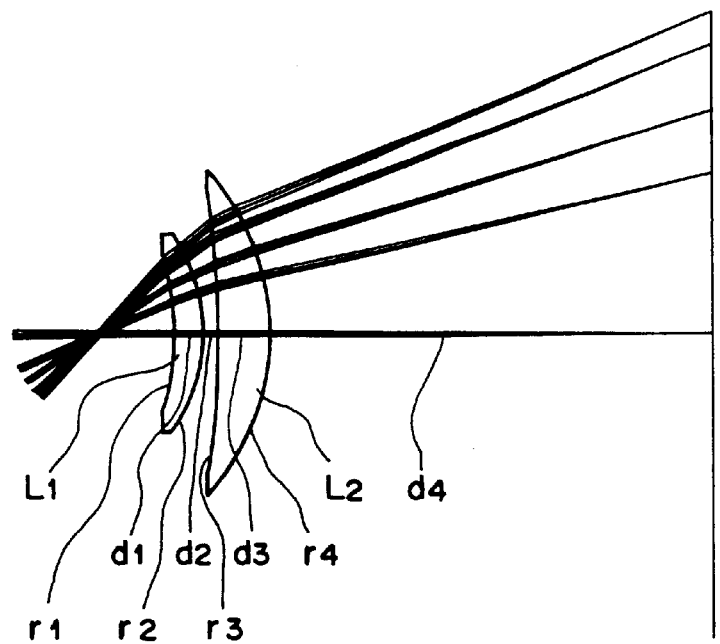
FIG. 9 is a view showing the arrangement of a second example of the scanning/imaging optical system which can be employed in the present invention.

A second specified example of the scanning/imaging optical system which can be employed in the light beam scanning system of the present invention where a divergent light beam is used is shown in FIG. 9. The scanning/imaging optical system of the second specified example consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 3. The scanning/imaging optical system of the second example satisfies the aforesaid formulae (1) to (3).

TABLE 3

| | | lens data | | |
|---|---|---|---|---|
| | face No. | r | d | glass |
| diverging | 1 | −296.50843 | 10.000000 | BSC7 HOYA |
| optical system | 2 | 1693.56893 | 48.250492 | |
| deflector | | | 50.000000 | |
| scanning/ | 1 | −181.24083 | 20.000000 | BSC7 HOYA |
| imaging | 2 | −116.60218 | 9.949180 | |
| optical system | 3 | −660.63182 | 35.520000 | BAFD7 HOYA |
| | 4 | −164.80292 | 300.076393 | |
| entrance pupil diameter | | | 3.00 | |
| wavelength | | | 657 nm | |
| maximum scanning angle (half) | | | 48° | |
| | | power distribution | | |
| $f_{GF}$ | −489.80 | $f_{GR1}$ | 575.26 | |
| $f_{GR}$ | 203.44 | $f_{GR2}$ | 306.27 | |

TABLE 3-continued

| $f_{all}$ | 229.58 | $f_{all}/f_{GF}$ | −0.469 |
|---|---|---|---|
| | performance | | |
| ratio | scanning angle | curvature of field | fθ (%) |
| 1.0 | 48.0 | −0.390 | −0.024 |
| 0.9 | 43.2 | 0.500 | 0.032 |
| 0.8 | 38.4 | 0.397 | 0.042 |
| 0.7 | 33.6 | 0.005 | 0.023 |
| 0.6 | 28.8 | −0.336 | −0.017 |
| 0.5 | 24.0 | −0.500 | −0.067 |
| 0.4 | 19.2 | −0.487 | −0.120 |
| 0.3 | 14.4 | −0.356 | −0.168 |
| 0.2 | 9.6 | −0.186 | −0.207 |
| 0.1 | 4.8 | −0.051 | −0.233 |
| 0.0 | 0.0 | 0.000 | −0.241 |
| min | | −0.500 | −0.241 |
| max | | 0.500 | 0.042 |
| p-p | | 1.000 | 0.284 |

Figure 10:
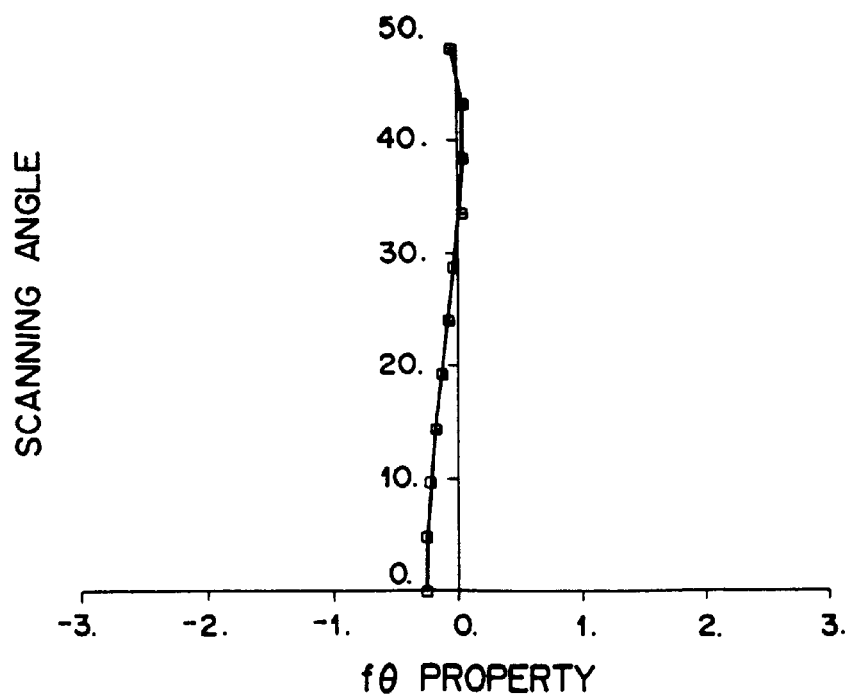
FIG. 10 is a view showing the relation between the fθ properties and the scanning angle in the scanning/imaging optical system of the second example.
Figure 11:
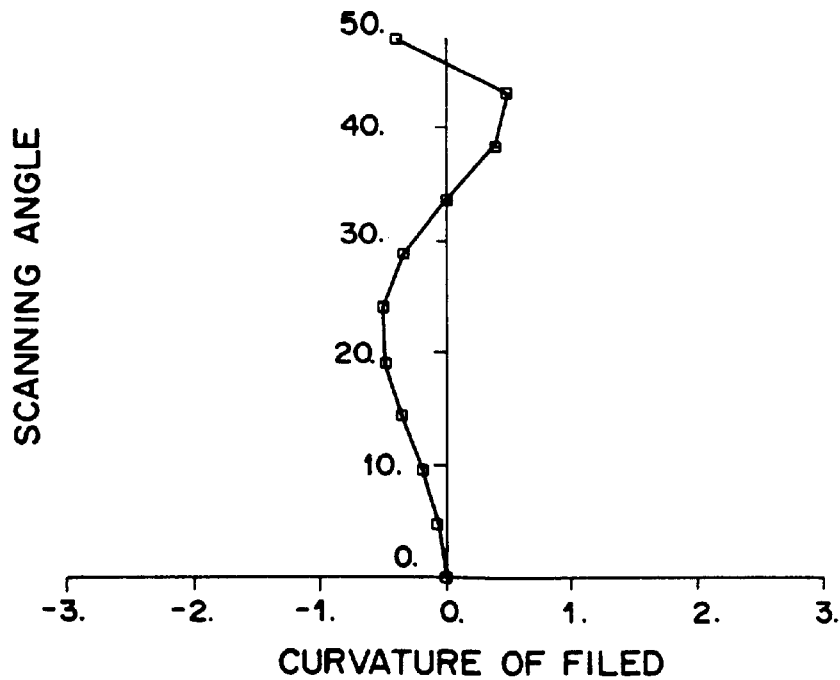
FIG. 11 is a view showing the relation between the curvature of field in the main scanning direction and the scanning angle in the scanning/imaging optical system of the second example.

The relation between the fθ properties and the scanning angle and the relation between the curvature of field in the main scanning direction and the scanning angle in this example are shown in FIGS. 10 and 11 respectively. As can be seen from table 3 and FIGS. 10 and 11, this example is equivalent to the comparative scanning/imaging optical system in the curvature of field in the main scanning direction and is greatly superior to the comparative scanning/imaging optical system in the fθ properties, that is, the former is less than half of the latter in p—p.

EXAMPLE 3

Figure 12:
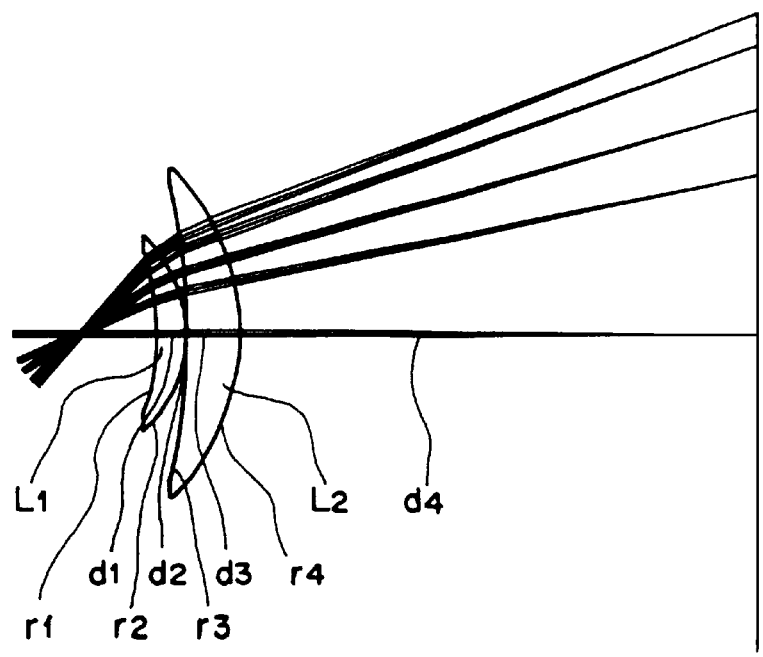
FIG. 12 is a view showing the arrangement of a third example of the scanning/imaging optical system which can be employed in the present invention.

A third specified example of the scanning/imaging optical system which can be employed in the light beam scanning system of the present invention where a divergent light beam is used is shown in FIG. 12. The scanning/imaging optical system of the third specified example consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 4. The scanning/imaging optical system of the first example satisfies the aforesaid formulae (1) to (3).

TABLE 4

| | | lens data | | |
|---|---|---|---|---|
| | face No. | r | d | glass |
| diverging | 1 | 169.76674 | 10.000000 | BSC7 HOYA |
| optical system | 2 | 62.18129 | 35.548159 | |
| deflector | | | 50.000000 | |
| scanning/ | 1 | −181.75149 | 20.000000 | BSC7 HOYA |
| imaging | 2 | −87.88511 | 0.005000 | |
| optical system | 3 | −451.56383 | 35.520000 | BAFD7 HOYA |
| | 4 | −157.51001 | 348.870195 | |
| entrance pupil diameter | | | 3.00 | |
| wavelength | | | 657 nm | |
| maximum scanning angle (half) | | | 48° | |

TABLE 4-continued power distribution

| | | | |
|---|---|---|---|
| $f_{GF}$ | −197.00 | $f_{GR1}$ | 308.55 |
| $f_{GR}$ | 164.58 | $f_{GR2}$ | 330.89 |
| $f_{all}$ | 220.00 | $f_{all}/f_{GF}$ | −1.117 | performance

| ratio | scanning angle | curvature of field | fθ (%) |
|---|---|---|---|
| 1.0 | 48.0 | 0.102 | −0.004 |
| 0.9 | 43.2 | 0.500 | 0.005 |
| 0.8 | 38.4 | 0.280 | 0.008 |
| 0.7 | 33.6 | −0.090 | 0.005 |
| 0.6 | 28.8 | −0.377 | −0.002 |
| 0.5 | 24.0 | −0.500 | −0.013 |
| 0.4 | 19.2 | −0.468 | −0.025 |
| 0.3 | 14.4 | −0.336 | −0.038 |
| 0.2 | 9.6 | −0.174 | −0.048 |
| 0.1 | 4.8 | −0.047 | −0.055 |
| 0.0 | 0.0 | 0.000 | −0.058 |
| min | | −0.500 | −0.058 |
| max | | 0.500 | 0.008 |
| p-p | | 1.000 | 0.066 |

Figure 13:
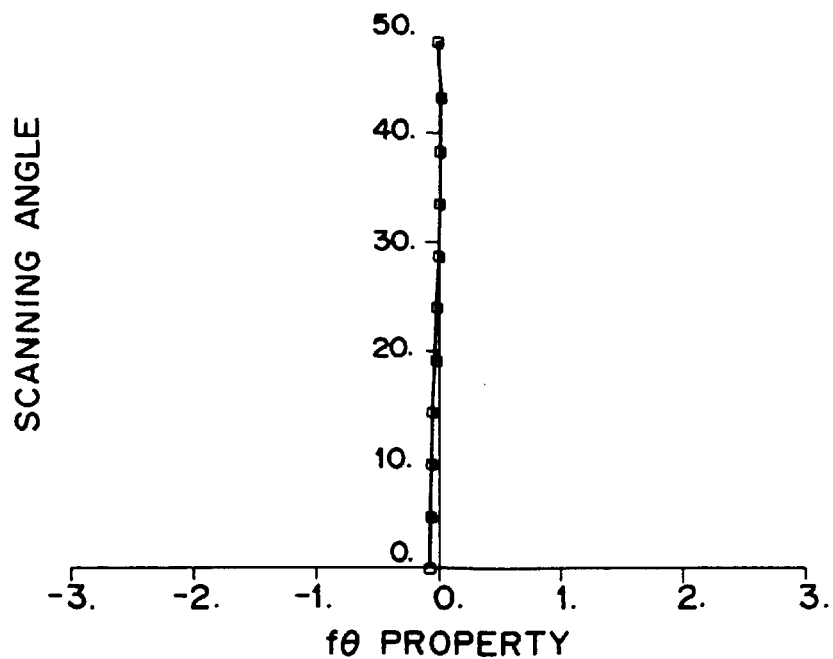
FIG. 13 is a view showing the relation between the fθ properties and the scanning angle in the scanning/imaging optical system of the third example.
Figure 14:
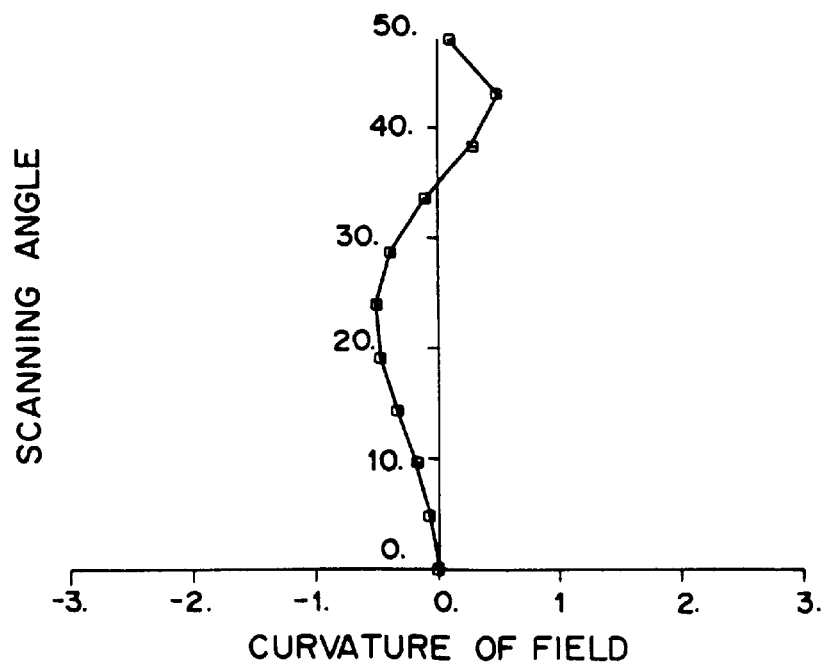
FIG. 14 is a view showing the relation between the curvature of field in the main scanning direction and the scanning angle in the scanning/imaging optical system of the third example.

The relation between the fθ properties and the scanning angle and the relation between the curvature of field in the main scanning direction and the scanning angle in this example are shown in FIGS. 13 and 14 respectively. As can be seen from table 4 and FIGS. 13 and 14, this example is equivalent to the comparative scanning/imaging optical system in the curvature of field in the main scanning direction and is greatly superior to the comparative scanning/imaging optical system in the fθ properties, that is, the former is substantially 1/10 of the latter in p—p.

EXAMPLE 4

Figure 15:
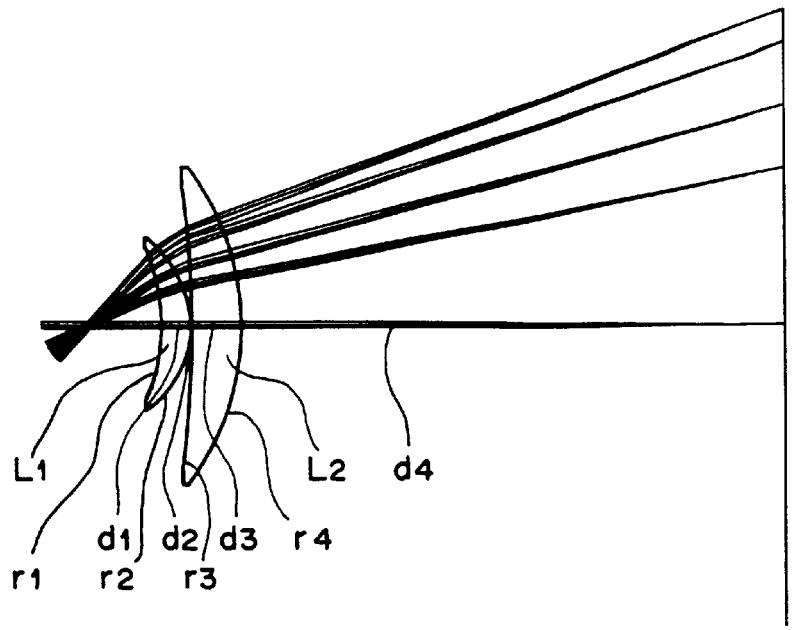
FIG. 15 is a view showing the arrangement of a fourth example of the scanning/imaging optical system which can be employed in the present invention.

A fourth specified example of the scanning/imaging optical system which can be employed in the light beam scanning system of the present invention where a divergent light beam is used is shown in FIG. 15. The scanning/imaging optical system of the fourth specified example consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 5. The scanning/imaging optical system of the fourth example satisfies the aforesaid formulae (1) to (3).

TABLE 5 lens data

| | face No. | r | d | glass |
|---|---|---|---|---|
| diverging optical system | 1 | −175.20850 | 10.000000 | BSC7 HOYA |
| | 2 | 149.13003 | 21.656209 | |
| deflector | | | 50.000000 | |
| scanning/ imaging optical system | 1 | −133.13068 | 20.000000 | BSC7 HOYA |
| | 2 | −72.99524 | 0.100000 | |
| | 3 | −795.18051 | 35.520000 | BAFD7 HOYA |
| | 4 | −178.17250 | 370.688079 | |

TABLE 5-continued

| entrance pupil diameter | 3.00 |
|---|---|
| wavelength | 657 nm |
| maximum scanning angle (half) | 48° | power distribution

| | | | |
|---|---|---|---|
| $f_{GF}$ | −155.02 | $f_{GR1}$ | 282.33 |
| $f_{GR}$ | 153.51 | $f_{GR2}$ | 322.09 |
| $f_{all}$ | 219.96 | $f_{all}/f_{GF}$ | −1.419 | performance

| ratio | scanning angle | curvature of field | fθ (%) |
|---|---|---|---|
| 1.0 | 48.0 | −1.415 | −0.002 |
| 0.9 | 43.2 | −0.574 | −0.004 |
| 0.8 | 38.4 | −0.338 | −0.019 |
| 0.7 | 33.6 | −0.341 | −0.042 |
| 0.6 | 28.8 | −0.387 | −0.070 |
| 0.5 | 24.0 | −0.389 | −0.100 |
| 0.4 | 19.2 | −0.328 | −0.128 |
| 0.3 | 14.4 | −0.225 | −0.154 |
| 0.2 | 9.6 | −0.114 | −0.174 |
| 0.1 | 4.8 | −0.031 | −0.186 |
| 0.0 | 0.0 | 0.000 | −0.190 |
| min | | −1.415 | −0.190 |
| max | | 0.000 | 0.000 |
| p-p | | 1.415 | 0.190 |

Figure 16:
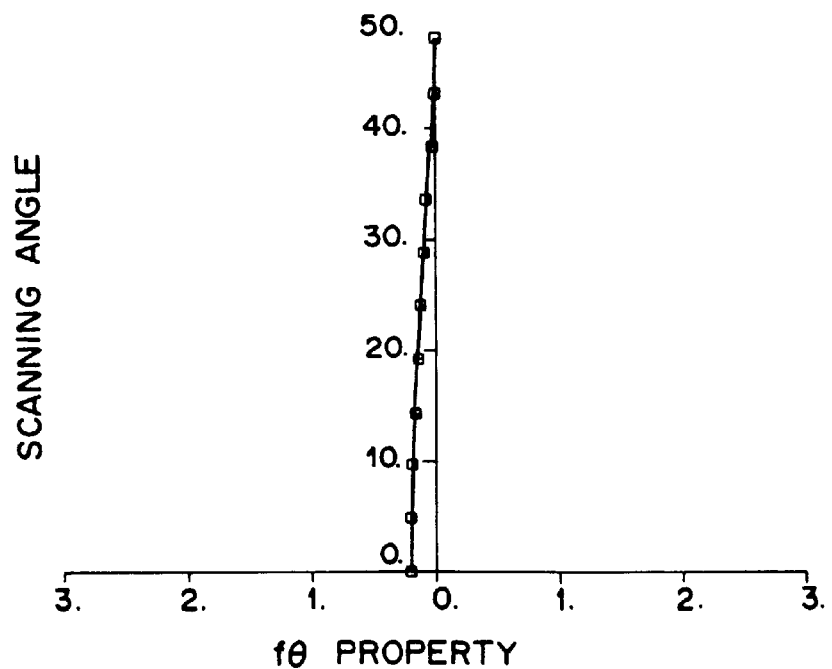
FIG. 16 is a view showing the relation between the fθ properties and the scanning angle in the scanning/imaging optical system of the fourth example.
Figure 17:
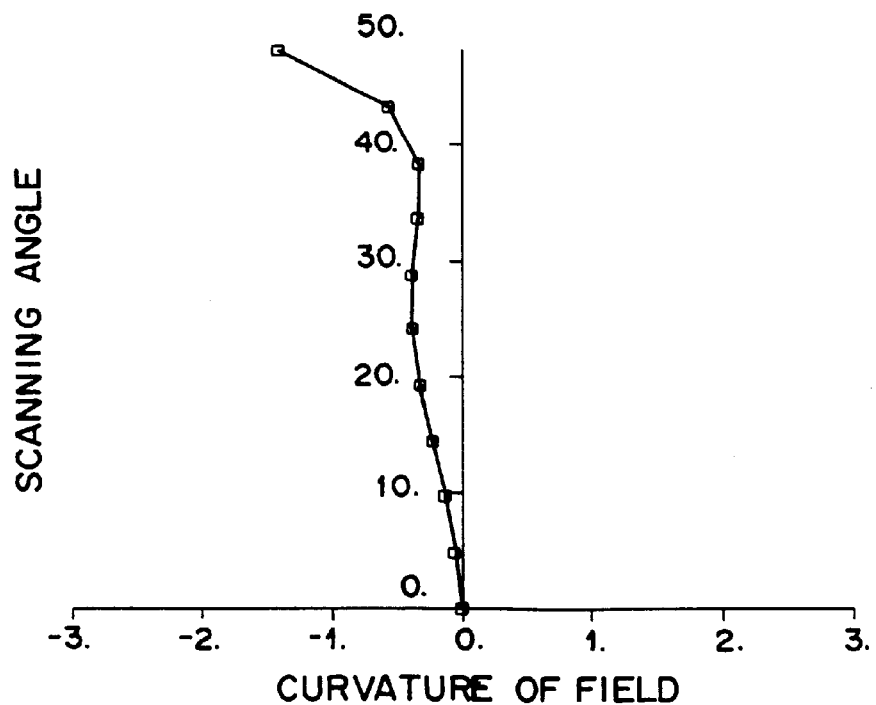
FIG. 17 is a view showing the relation between the curvature of field in the main scanning direction and the scanning angle in the scanning/imaging optical system of the fourth example.

The relation between the fθ properties and the scanning angle and the relation between the curvature of field in the main scanning direction and the scanning angle in this example are shown in FIGS. 16 and 17 respectively. As can be seen from table 5 and FIGS. 16 and 17, this example is practically satisfactory in the curvature of field in the main scanning direction though slightly inferior to the comparative scanning/imaging optical system, and is greatly superior to the comparative scanning/imaging optical system in the fθ properties, that is, the former is less than 1/3 of the latter in p—p.

EXAMPLE 5

Figure 18:
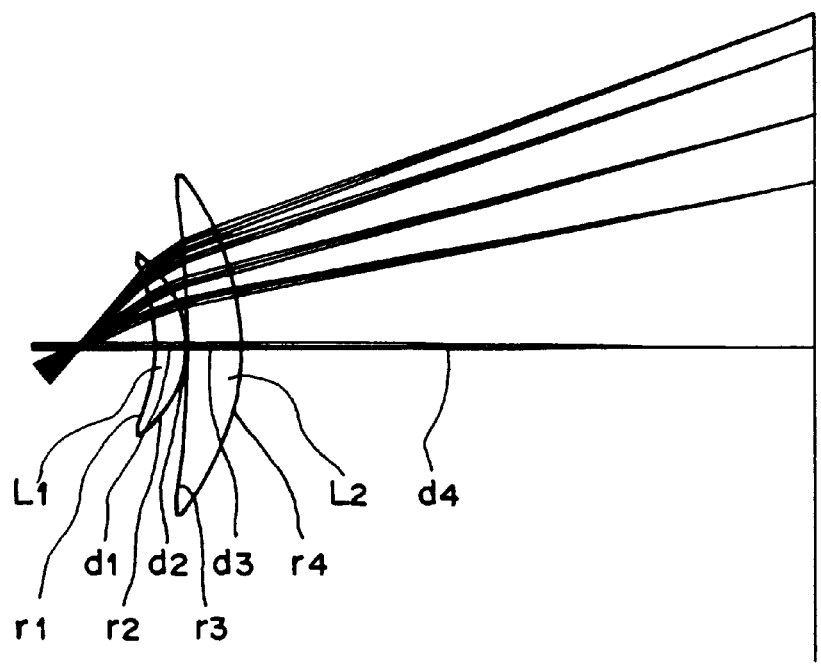
FIG. 18 is a view showing the arrangement of a fifth example of the scanning/imaging optical system which can be employed in the present invention.

A fifth specified example of the scanning/imaging optical system which can be employed in the light beam scanning system of the present invention where a divergent light beam is used is shown in FIG. 18. The scanning/imaging optical system of the fifth specified example consists of first and second lens elements L1 and L2. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 6. The scanning/imaging optical system of the fifth example satisfies the aforesaid formulae (2) and (3) but does not satisfy the aforesaid formula (1). Further the degree of divergence in the diverging optical system is larger than those in the first to fourth examples.

TABLE 6 lens data

| | face No. | r | d | glass |
|---|---|---|---|---|
| diverging optical system | 1 | −164.93711 | 10.000000 | BSC7 HOYA |
| | 2 | 149.22184 | 20.332585 | |
| deflector | | | 50.000000 | |
| scanning/imaging optical system | 1 | −126.58106 | 20.000000 | BSC7 HOYA |
| | 2 | −70.79908 | 0.100000 | |
| | 3 | −746.01918 | 35.520000 | BAFD7 HOYA |
| | 4 | −175.50909 | 374.102711 | |

| | |
|---|---|
| entrance pupil diameter | 3.00 |
| wavelength | 657 nm |
| maximum scanning angle (half) | 48° | power distribution

| | | | |
|---|---|---|---|
| $f_{GF}$ | −150.70 | $f_{GR1}$ | 278.47 |
| $f_{GR}$ | 152.19 | $f_{GR2}$ | 321.31 |
| $f_{all}$ | 219.94 | $f_{all}/f_{GF}$ | −1.459 | performance

| ratio | scanning angle | curvature of field | fθ (%) |
|---|---|---|---|
| 1.0 | 48.0 | −2.911 | 0.061 |
| 0.9 | 43.2 | −1.576 | −0.019 |
| 0.8 | 38.4 | −0.955 | −0.102 |
| 0.7 | 33.6 | −0.682 | −0.184 |
| 0.6 | 28.8 | −0.547 | −0.261 |
| 0.5 | 24.0 | −0.443 | −0.332 |
| 0.4 | 19.2 | −0.332 | −0.393 |
| 0.3 | 14.4 | −0.214 | −0.442 |
| 0.2 | 9.6 | −0.105 | −0.479 |
| 0.1 | 4.8 | −0.028 | −0.502 |
| 0.0 | 0.0 | 0.000 | −0.509 |
| min | | −2.911 | −0.509 |
| max | | 0.000 | 0.061 |
| p-p | | 2.911 | 0.571 |

Figure 19:
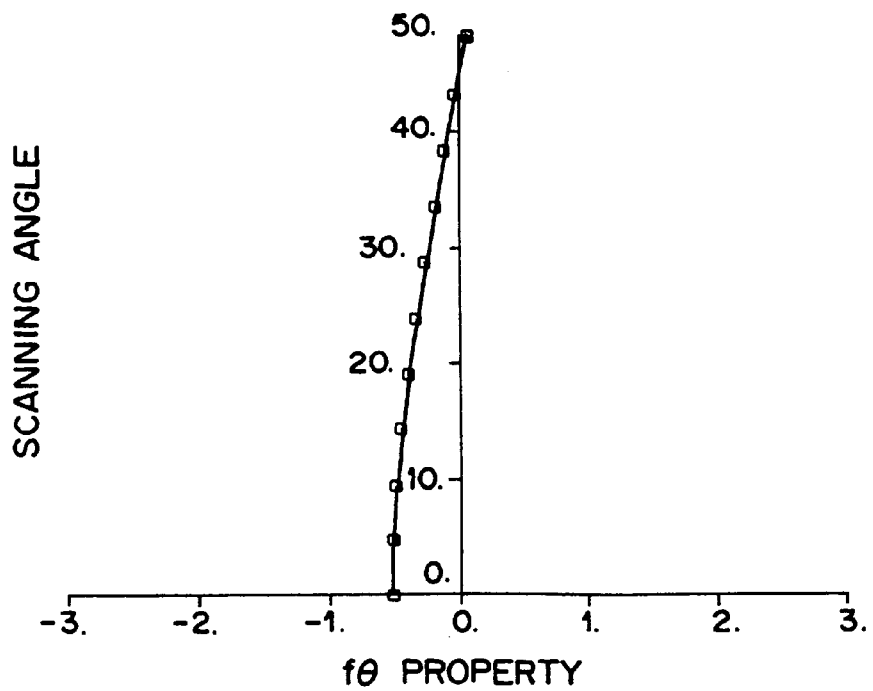
FIG. 19 is a view showing the relation between the fθ properties and the scanning angle in the scanning/imaging optical system of the fifth example.
Figure 20:
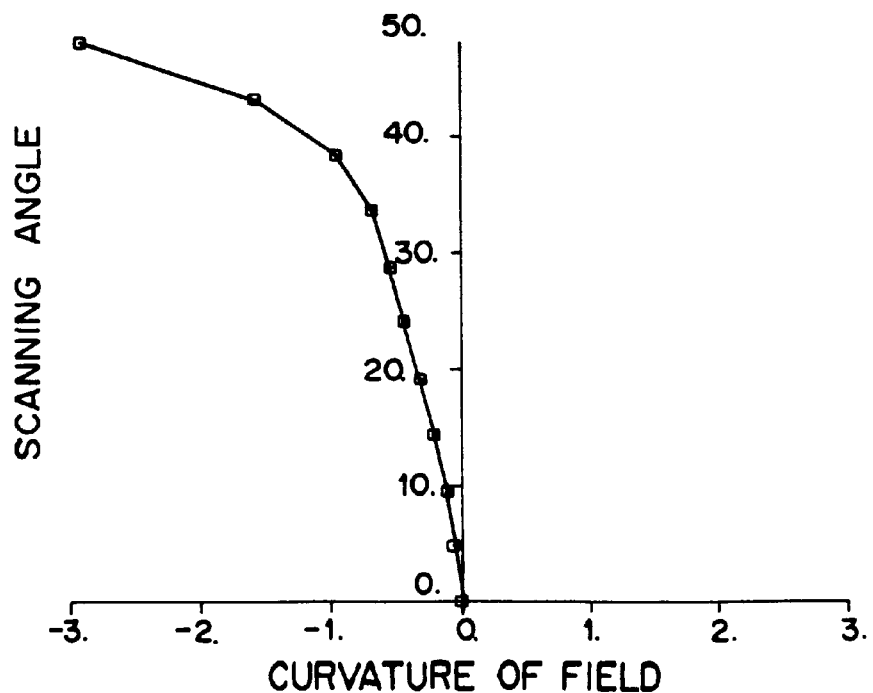
FIG. 20 is a view showing the relation between the curvature of field in the main scanning direction and the scanning angle in the scanning/imaging optical system of the fifth example.

The relation between the fθ properties and the scanning angle and the relation between the curvature of field in the main scanning direction and the scanning angle in this example are shown in FIGS. 19 and 20, respectively. As can be seen from table 6 and FIGS. 19 and 20, though being inferior to the first to fourth examples both in the curvature of field in the main scanning direction and in the fθ properties, this example is superior to the comparative scanning/imaging optical system in the fθ properties. That is, in accordance with the present invention, the fθ properties can be improved even if the aforesaid formulae (1) to (3) are not all satisfied. However when the aforesaid formulae (1) to (3) are all satisfied, the curvature of field in the main scanning direction can be improved as well as the fθ properties.

EXAMPLE 6

A sixth specified example of the scanning/imaging optical system which can be employed in the light beam scanning system of the present invention where the cylindrical lens 7C and the cylindrical mirror 9 are employed to correct fluctuation in pitches on the surface 4 due to tilt of deflecting surfaces of the rotary polygonal mirror 5 as shown in FIG. 2A and 2B. The radii of curvature r (mm) of the faces of the lenses L1 and L2, the axial surface separations d (mm), glass materials, the diameter of the entrance pupil, the wavelength, half of the maximum scanning angle, the power distribution of the lenses and the performance of the scanning/imaging optical system are as shown in the following table 7. Table 7 also includes data on the cylindrical lenses 6 and 7C and the cylindrical mirror 9. The scanning/imaging optical system of the sixth example satisfies the aforesaid formulae (1) to (3).

TABLE 7 lens data

| | face No. | r | d | glass | |
|---|---|---|---|---|---|
| diverging optical system | 1 | −72.45501 | 10.080202 | BSC7 HOYA | |
| | 2 | −80.40815 | 50.000000 | | |
| cylindrical lens | 1 | 119.54400 | 7.000000 | BSC7 HOYA | flat in main scanning section |
| | 2 | flat | 250.00000 | | |
| deflector | | | 50.000000 | | |
| scanning/imaging optical system | 1 | −262.72129 | 20.013749 | BSC7 HOYA | shift in scanning/imaging optical |
| | 2 | −152.15546 | 35.536232 | | |
| | 3 | −1100.58653 | 35.524405 | BAFD7 HOYA | system:−2.23 |
| | 4 | −206.31979 | 25.578264 | | |
| cylindrical lens | 1 | flat | 10.000000 | BSC7 HOYA | |
| | 2 | 82.66371 | 80.600132 | | flat in main scanning section |
| cylindrical mirror | 1 | −217.42690 | 140.0000 | | inclined at 44° |
| surface scanned | | | | | |

| | |
|---|---|
| entrance pupil diameter | 3.50 |
| wavelength | 657 nm |
| maximum scanning angle (half) | 48° | power distribution

| | | | |
|---|---|---|---|
| $f_{GF}$ | −2500.88 | $f_{GR1}$ | 662.275 |
| $f_{GR}$ | 243.11 | $f_{GR2}$ | 358.735 |
| $f_{all}$ | 217.93 | $f_{all}/f_{GF}$ | −0.087 |

TABLE 7-continued

| | | performance | |
|---|---|---|---|
| ratio | scanning angle | curvature of field | fθ (%) |
| 1.0 | 48.0 | 1.196 | 0.004 |
| 0.9 | 43.2 | 0.671 | 0.072 |
| 0.7 | 33.6 | −0.404 | 0.006 |
| 0.5 | 24.0 | −0.550 | −0.212 |
| 0.0 | 0.0 | 0.000 | 0.000 |
| −0.5 | −24.0 | −1.215 | 0.065 |
| −0.7 | −33.6 | −0.593 | 0.136 |
| −0.9 | −43.2 | 0.923 | 0.105 |
| −1.0 | −48.0 | 1.207 | 0.004 |
| min | −1.215 | −0.212 | |
| max | 1.207 | 0.136 | |
| p-p | 2.421 | 0.348 | |

Figure 21:
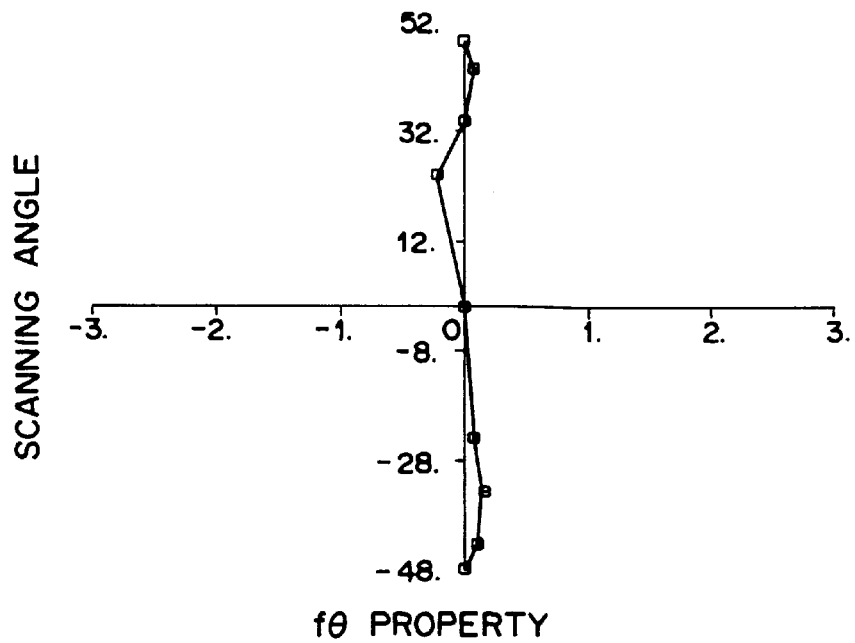
FIG. 21 is a view showing the relation between the fθ properties and the scanning angle in the scanning/imaging optical system of a sixth example.
Figure 22:
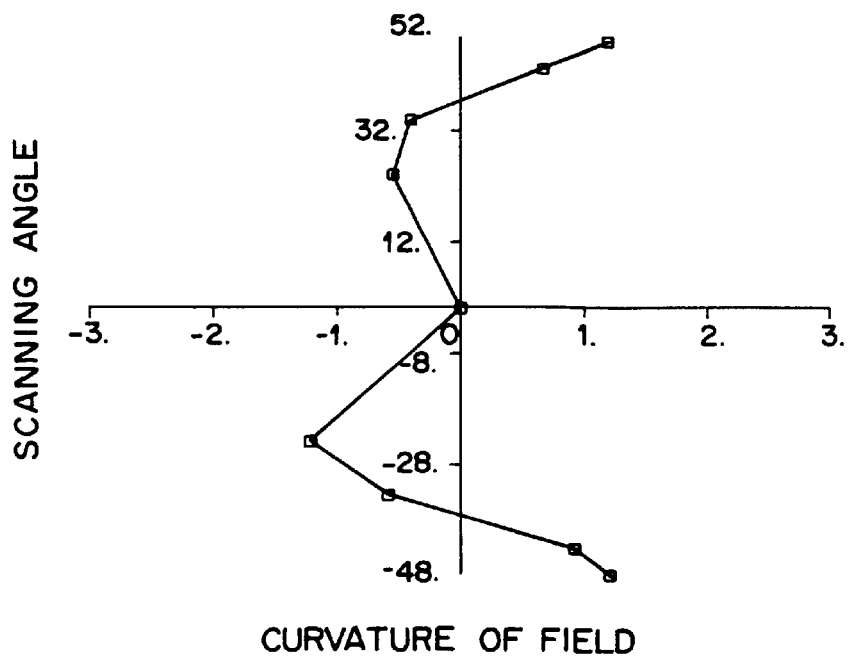
FIG. 22 is a view showing the relation between the curvature of field in the main scanning direction and the scanning angle in the scanning/imaging optical system of the sixth example.

The relation between the fθ properties and the scanning angle and the relation between the curvature of field in the main scanning direction and the scanning angle in this example are shown in FIGS. 21 and 22, respectively. As can be seen from table 7 and FIGS. 21 and 22, though being inferior to the first to fourth examples both in the curvature of field in the main scanning direction and in the fθ properties, this example is superior to the comparative scanning/imaging optical system in the fθ properties.

Figure 23:
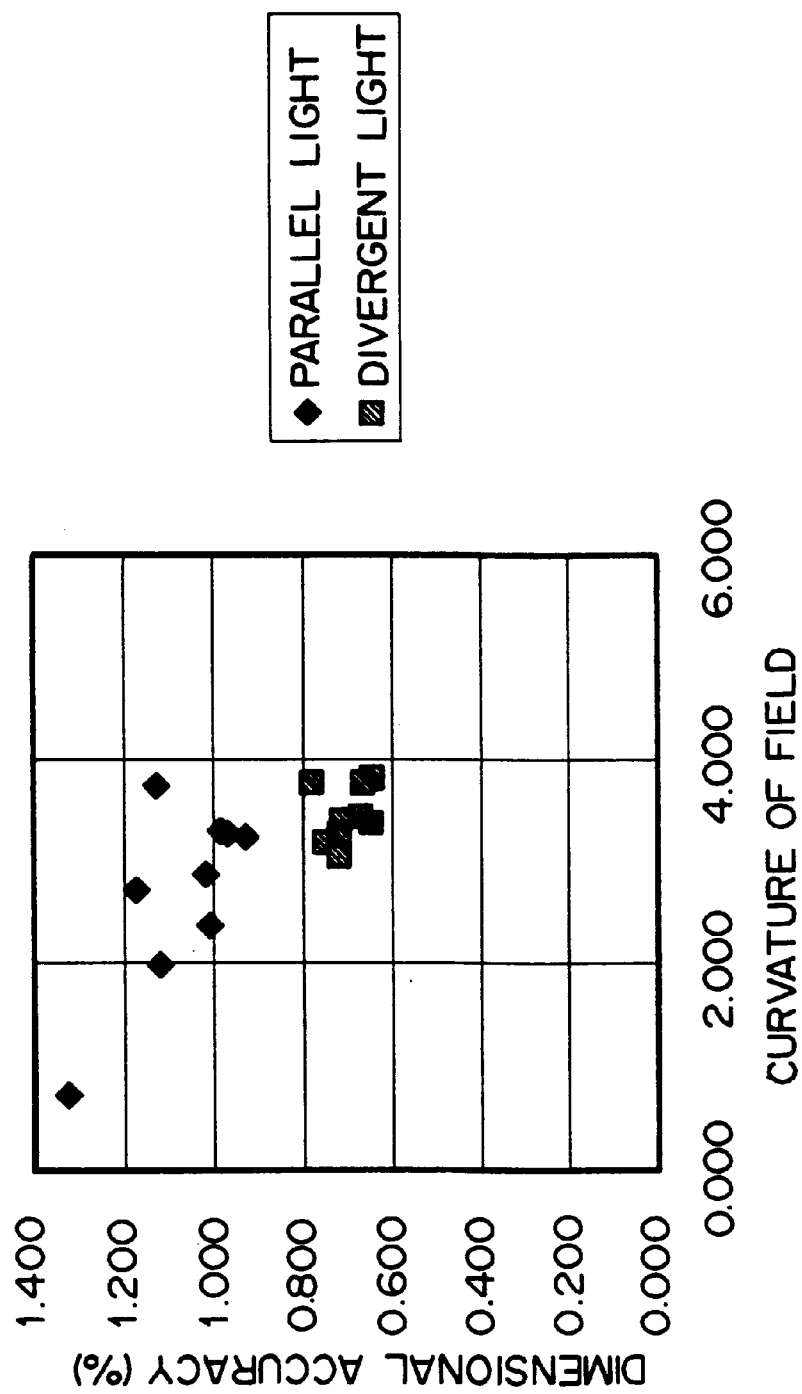
FIG. 23 is a view showing the relations between the curvature of field in the main scanning direction and the fθ properties (accuracy in the dimensions of the image) for parallel light and divergent light.

FIG. 23 is a view showing the relations between the curvature of field in the main scanning direction and the fθ properties (accuracy in the dimensions of the image) for parallel-light and divergent light.

Figure 24:
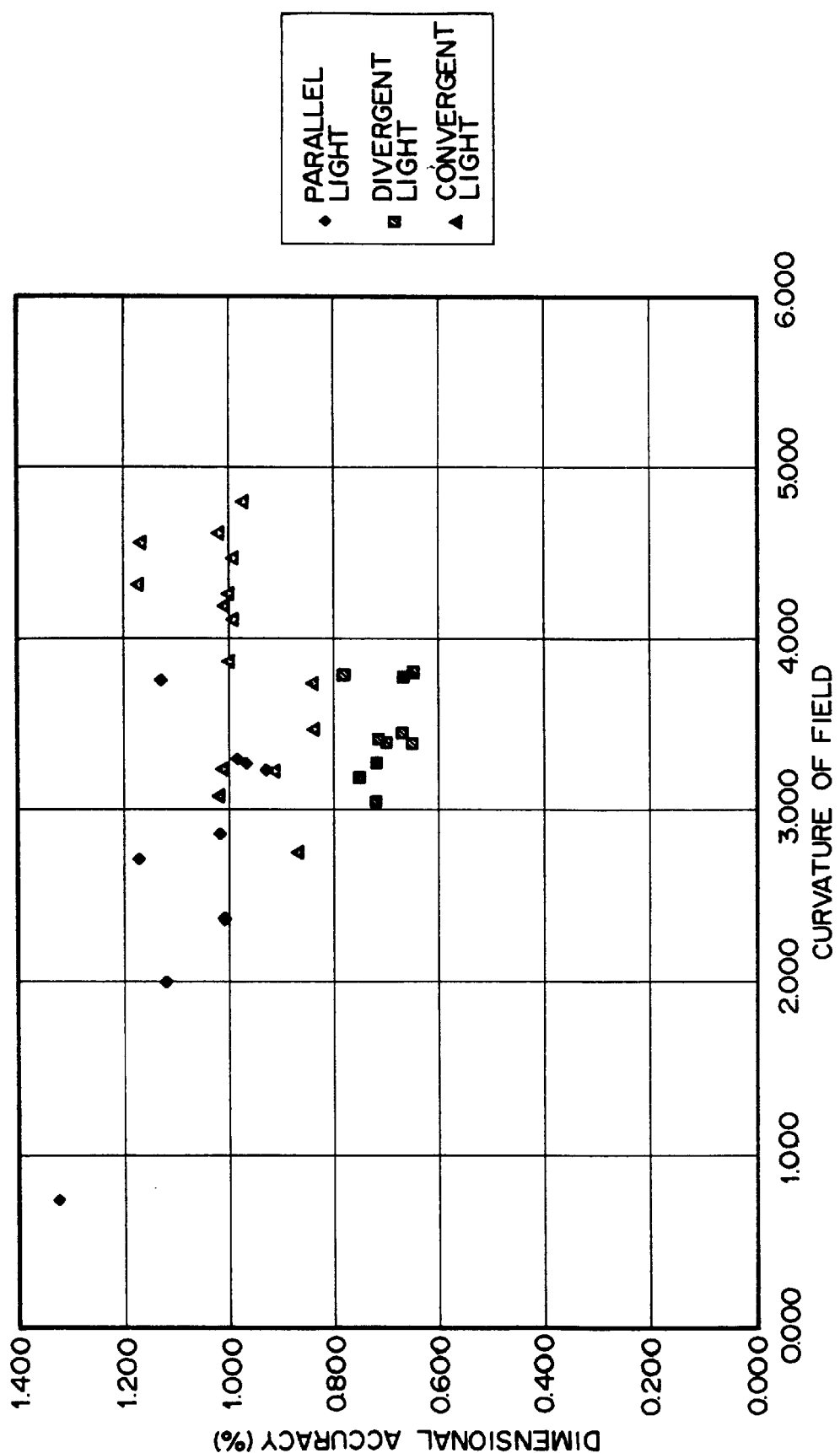
FIG. 24 is a view showing the relations between the curvature of field in the main scanning direction and the fθ properties (accuracy in the dimensions of the image) for parallel light, divergent light and convergent light.

A result of comparison of the relations between the curvature of field in the main scanning direction and the fθ properties (accuracy in the dimensions of the image) of pieces of data for various scanning/imaging optical systems are shown in FIGS. 23 and 24. FIG. 23 shows the result of the comparison for parallel light and divergent light and FIG. 24 shows the result of the comparison for parallel light, divergent light and convergent light. As can be seen from FIG. 23, the light beam scanning systems employing a divergent light beam is superior to those employing a parallel light beam in the fθ properties though equivalent or slightly inferior to the same in the curvature of field in the main scanning direction. Further as can be seen from FIG. 24, the light beam scanning systems employing a divergent light beam is superior to those employing a convergent light beam both in the fθ properties and the curvature of field in the main scanning direction.

The light beam scanning system of the present invention may be variously modified without limited to the embodiments described above. For example, the radii of curvature r of the lenses and the surface separations d (separations between the lenses and the thicknesses of the lenses) may be variously changed.

What is claimed is:

1. A light beam scanning system comprising:
a beam shaper means which shapes a light beam emitted from a light source, wherein the beam shaper means comprises a diverging optical system which converts the light beam into divergent light;
a deflector means which deflects the light beam to scan a surface in a main scanning direction; and
a scanning/imaging optical system which causes the light beam deflected by the deflector to form an image on the surface and scan the surface;
wherein the light beam entering the scanning/imaging optical system is the divergent light converted by the diverging optical system;
wherein the scanning/imaging optical system consists of, in an order from the light source side, a first lens element and a second lens element, wherein the scanning/imaging optical system has first to fourth surfaces as numbered from the light source side and satisfies the following formulae (1) to (3):

$$-1.42 < f_{all}/f_{GF} < 0 \tag{1}$$

$$r_{1GR} < 0, r_{2GR} < 0, r_{4GR} < 0 \tag{2}$$

$$f_{GR1} > 0, f_{GR2} > 0 \tag{3}$$

wherein $f_{all}$ represents the composite focal length of the beam shaper means and the scanning/imaging optical system, $f_{GF}$ represents the focal length of the beam shaper means, $r_{1GR}$ represents the radius of curvature of the first surface of the scanning/imaging optical system, $r_{2GR}$ represents the radius of curvature of the second surface of the scanning/imaging optical system, $r_{4GR}$ represents the radius of curvature of the fourth surface of the scanning/imaging optical system, $f_{GR1}$ represents the focal length of the first lens element and $f_{GR2}$ represents the focal length of the second lens element.

2. A light beam scanning system as defined in claim 1 further comprising a surface tilt correction optical system for correcting fluctuation in pitches on the surface to be scanned due to tilt of the deflecting surface of the deflector means.

3. A light beam scanning system as defined in claim 1 further comprising a surface tilt correction optical system for correcting fluctuation in pitches on the surface to be scanned due to tilt of the deflecting surface of the deflector means.

4. A light beam scanning system comprising:
a light source;
a beam shaper which shapes a light beam emitted from the light source, wherein the beam shaper comprises a diverging optical lens which converts the light beam into divergent light;
a deflector which deflects the light beam to scan a surface in a main scanning direction; and
a scanning/imaging optical system which causes the light beam deflected by the deflector to form an image on the surface and scan the surface;
wherein the scanning/imaging optical system satisfies the formula:

$$-1.42 < f_{all}/f_{GF} < 0 \tag{1}$$

wherein $f_{all}$ represents the composite focal length of the beam shaper and the scanning/imaging optical system, and $f_{GF}$ represents the focal length of the beam shaper means.

5. A light beam scanning system as defined in claim 4 in which the scanning/imaging optical system consists of, in an order from the light source side, a first lens element and a second lens element, wherein the scanning/imaging optical system has first to fourth surfaces as numbered from the light source side and further satisfies the following formulae (2) to (3):

$$r_{1GR}<0, r_{2GR}<0, r_{4GR}<0 \quad (2)$$

$$f_{GR1}>0, f_{GR2}>0 \quad (3)$$

wherein $r_{1GR}$ represents the radius of curvature of the first surface of the scanning/imaging optical system, $r_{2GR}$ represents the radius of curvature of the second surface of the scanning/imaging optical system, $r_{4GR}$ represents the radius of curvature of the fourth surface of the scanning/imaging optical system, $f_{GR1}$ represents the focal length of the first lens element and $f_{GR2}$ represents the focal length of the second lens element.

6. A light beam scanning system as defined in claim 5 further comprising a surface tilt correction optical system for correcting fluctuation in pitches on the surface to be scanned due to tilt of the deflecting surface of the deflector.

7. A light beam scanning system as defined in claim 4 further comprising a surface tilt correction optical system for correcting fluctuation in pitches on the surface to be scanned due to tilt of the deflecting surface of the deflector.

* * * * *